(12) United States Patent
Long et al.

(10) Patent No.: US 11,347,107 B2
(45) Date of Patent: May 31, 2022

(54) ARRAY SUBSTRATE AND METHOD FOR MANUFACTURING THE SAME, AND DISPLAY DEVICE

(71) Applicant: BOE TECHNOLOGY GROUP CO., LTD., Beijing (CN)

(72) Inventors: Chunping Long, Beijing (CN); Yong Qiao, Beijing (CN); Xinyin Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/476,575

(22) PCT Filed: Oct. 18, 2018

(86) PCT No.: PCT/CN2018/110831
§ 371 (c)(1),
(2) Date: Jul. 9, 2019

(87) PCT Pub. No.: WO2019/076339
PCT Pub. Date: Apr. 25, 2019

(65) Prior Publication Data
US 2019/0353964 A1 Nov. 21, 2019

(30) Foreign Application Priority Data

Oct. 20, 2017 (CN) .......................... 201721364456.1

(51) Int. Cl.
*G02F 1/1337* (2006.01)
*G02F 1/1343* (2006.01)

(52) U.S. Cl.
CPC .. *G02F 1/133707* (2013.01); *G02F 1/134336* (2013.01)

(58) Field of Classification Search
CPC .................... G02F 1/133707; G02F 1/134336
(Continued)

(56) References Cited

U.S. PATENT DOCUMENTS

2008/0143946 A1* 6/2008 Wang ................ G02F 1/133707
349/141
2008/0186440 A1* 8/2008 Lim .................. G02F 1/134363
349/141

(Continued)

FOREIGN PATENT DOCUMENTS

CN       102388337 A    3/2012
CN       202583658 U   12/2012

(Continued)

OTHER PUBLICATIONS

International Search Report dated Jan. 2, 2019 corresponding to application No. PCT/CN2018/110831.

*Primary Examiner* — Dzung Tran
(74) *Attorney, Agent, or Firm* — Nath, Goldberg & Meyer; Joshua B. Goldberg

(57) ABSTRACT

The present disclosure provides an array substrate and a method for manufacturing the same, and a display device. The array substrate includes a plurality of pixel units arranged in a matrix, each the pixel unit includes a plurality of pixel regions, each pixel region is provided with a display electrode having a slit; a plurality of data lines, each of the data lines includes a plurality of data line segments, any two adjacent data line segments are electrically coupled to each other; in each of the pixel units, each of a part of the pixel regions has a display electrode whose slit is parallel to a data line segment adjacent to this display electrode in the data lines; each of another part of the pixel regions has a display electrode whose slit is non-parallel to a data line segment adjacent to this display electrode in the data lines.

9 Claims, 4 Drawing Sheets

(58) Field of Classification Search
USPC .......................................................... 257/40
See application file for complete search history.

(56) References Cited

U.S. PATENT DOCUMENTS

| | | | | |
|---|---|---|---|---|
| 2008/0225217 A1* | 9/2008 | Wakabayashi | .... | G02F 1/134363 |
| | | | | 349/144 |
| 2008/0303998 A1* | 12/2008 | Ohta | ................ | G02F 1/134363 |
| | | | | 349/143 |
| 2008/0309627 A1* | 12/2008 | Hotelling | ............... | G06F 3/044 |
| | | | | 345/173 |
| 2009/0086149 A1* | 4/2009 | Kim | ................ | G02F 1/134363 |
| | | | | 349/144 |
| 2010/0207862 A1* | 8/2010 | Xu | .................. | G02F 1/134336 |
| | | | | 345/90 |
| 2012/0050630 A1* | 3/2012 | Sato | ................ | G02F 1/134363 |
| | | | | 349/33 |
| 2013/0100106 A1* | 4/2013 | Wu | ..................... | G09G 3/2025 |
| | | | | 345/212 |

FOREIGN PATENT DOCUMENTS

| | | |
|---|---|---|
| CN | 103488011 A | 1/2014 |
| CN | 104536218 A | 4/2015 |
| CN | 204302631 U | 4/2015 |
| CN | 207249311 U | 4/2018 |
| KR | 101274958 B1 | 6/2013 |
| TW | 200537174 A | 11/2005 |

* cited by examiner

ARRAY SUBSTRATE AND METHOD FOR MANUFACTURING THE SAME, AND DISPLAY DEVICE

CROSS-REFERENCE TO RELATED APPLICATIONS

This is a National Phase Application filed under 35 U.S.C. 371 as a national stage of PCT/CN2018/110831, filed Oct. 18, 2018, an application claiming priority of Chinese Patent Application No. 201721364456.1, filed on Oct. 20, 2017, the contents of each are incorporated herein in their entirety by reference.

TECHNICAL FIELD

The present disclosure relates to the field of display technology, and in particular, relates to an array substrate and a method for manufacturing the same, and a display device.

BACKGROUND

Thin film transistor liquid crystal displays (TFT-LCDs) are important display devices. According to the direction of the electric field for driving liquid crystal, they can be categorized as a vertical electric field type and a horizontal electric field type. The LCD of vertical electric field type requires to form pixel electrode on array substrate, and form common electrode on color film substrate (CF substrate), such as commonly used TN mode LCD; while the LCD of horizontal electric field type requires to form both pixel electrode and common electrode on array substrate, such as fringe field switching (FFS) mode LCD.

Liquid crystal display devices are already massively used as display screens of consumer electronic products such as mobile phone, notebook, personal computer, and personal digital assistant. In the devices, an array substrate includes a plurality of gate lines, a plurality of data lines, and a plurality of pixel units electrically coupled to corresponding gate lines and data lines; each of the pixel units has its light transmittance controlled separately by a transistor. FFS mode LCD is a wide view angle technique suitable for both large-sized panel and small-sized panel, and is extensively researched and applied.

SUMMARY

An embodiment of the present disclosure provides an array substrate, including a plurality of pixel units arranged in a matrix, wherein each of the pixel units includes a plurality of pixel regions, and each of the pixel regions is provided with a display electrode having a slit: the array substrate further includes a plurality of data lines, each of the data lines includes a plurality of data line segments, and any two adjacent data line segments are electrically coupled to each other; wherein, in each of the pixel units, each of a part of the pixel regions has a display electrode whose slit is provided parallel to a data line segment adjacent to this display electrode in the data lines; each of another part of the pixel regions has a display electrode whose slit is provided non-parallel to a data line segment adjacent to this display electrode in the data lines.

In a specific implementation, the data line segment has a shape including a polyline type or a straight line type.

In a specific implementation, the display electrode has a contour provided parallel to the data line segment.

In a specific implementation, each of the pixel units includes two pixel regions provided along a direction of the data line; the array substrate further includes gate lines provided intercrossing with the data lines, wherein the gate line is located between the two pixel regions.

In a specific implementation, each of the pixel units is provided with two thin film transistors, wherein,
the two thin film transistors share a gate and a source, and the gate is electrically coupled to the gate line, the source is electrically coupled to the data line; a drain of one thin film transistor is coupled to the pixel electrode of one of the pixel regions, a drain of the other thin film transistor is coupled to the pixel electrode of the other of the pixel regions.

In a specific implementation, the array substrate further includes gate lines provided intercrossing with the data lines, and pixel units are defined at positions where the gate lines and the data lines intercross, wherein the display electrodes of each of the pixel units are provided at a same side of the gate line for this pixel unit.

Further in a specific implementation, each of the pixel units is provided with one thin film transistor, a source of the thin film transistor is coupled to the data line, a drain of the thin film transistor is coupled to any one of the pixel electrodes of this pixel unit, a gate of the thin film transistor is coupled to the gate line, and the display electrodes are coupled to each other.

In a specific implementation, the array substrate further includes gate lines provided intercrossing with the data lines, wherein
pixel units located in a same column are coupled to a same one of the data lines; pixel units located in a same row are coupled to a same one of the gate lines.

In a specific implementation, the display electrode includes a pixel electrode.

In a specific implementation, the array substrate further includes a common electrode located at a side of the pixel electrode facing away from light exiting surface.

The present disclosure further provides a display device including the above-described array substrate.

The present disclosure further provides a method for manufacturing an array substrate, including: providing a base substrate; forming a plurality of gate lines and a plurality of data lines intercrossing each other on the base substrate, the plurality of gate lines and the plurality of data lines define a plurality of pixel units arranged in a matrix, wherein, a plurality of pixel regions are formed in each of the pixel units, a display electrode having a slit is formed in each of the pixel regions; each data line is formed to include a plurality of data line segments, and any two adjacent data line segments are electrically coupled to each other, and wherein in each pixel unit, each of a part of the pixel regions has a display electrode whose slit is provided parallel to a data line segment adjacent to this pixel region in the data lines; each of another part of the pixel regions has a display electrode whose slit is provided non-parallel to a data line segment adjacent to this pixel region in the data lines.

Figure 1:
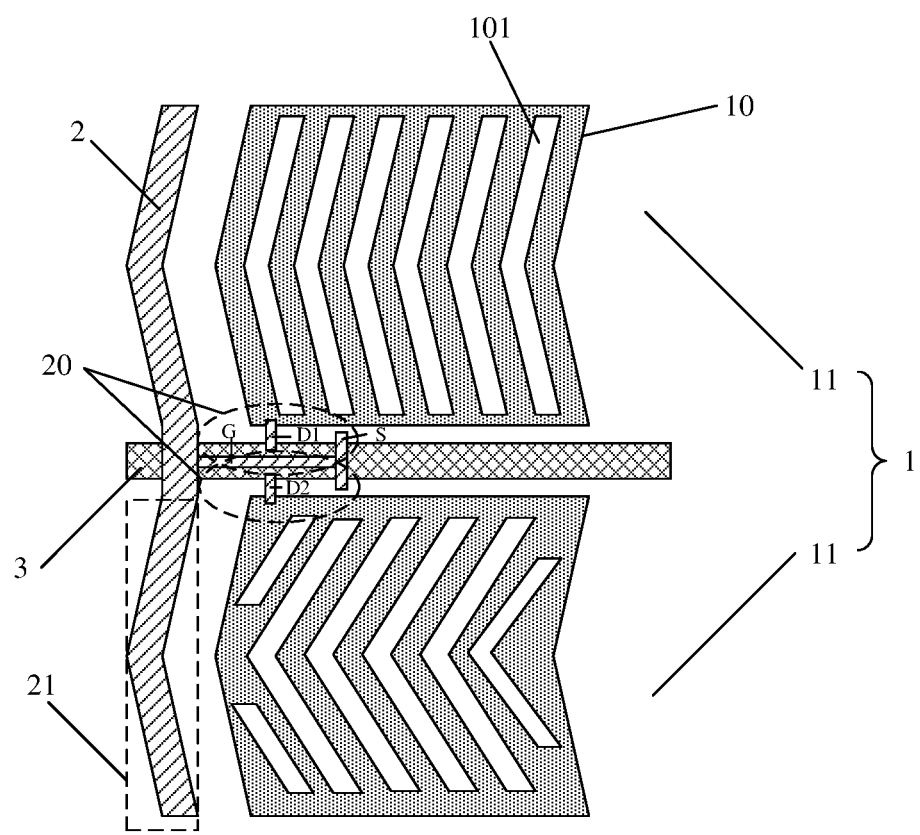
FIG. 1 is a schematic diagram of a pixel structure of an array substrate according to an embodiment of the present disclosure.

wherein reference numerals are as follows: 1: pixel unit; 11: pixel region; 10: display electrode; 101: slit; 20: thin film transistor; 2: data line; 21: data line segment; 3: gate line.

DETAILED DESCRIPTION

In order to allow a person skilled in the art to better understand technical solutions of the present invention, the present invention will be described in further detail below in conjunction with the accompanying drawings and specific implementations.

Generally, a FFS mode liquid crystal display device uses a plate-shaped common electrode and a pixel electrode having a slit, to form a fringe field electric field. The slit of the pixel electrode is usually designed symmetrically, and is kept parallel to the data lines, which is though advantageous to preventing leakage of light, yet singleness of direction of the slit and the electric field sacrifices part of view angle characteristics.

Figure 2:
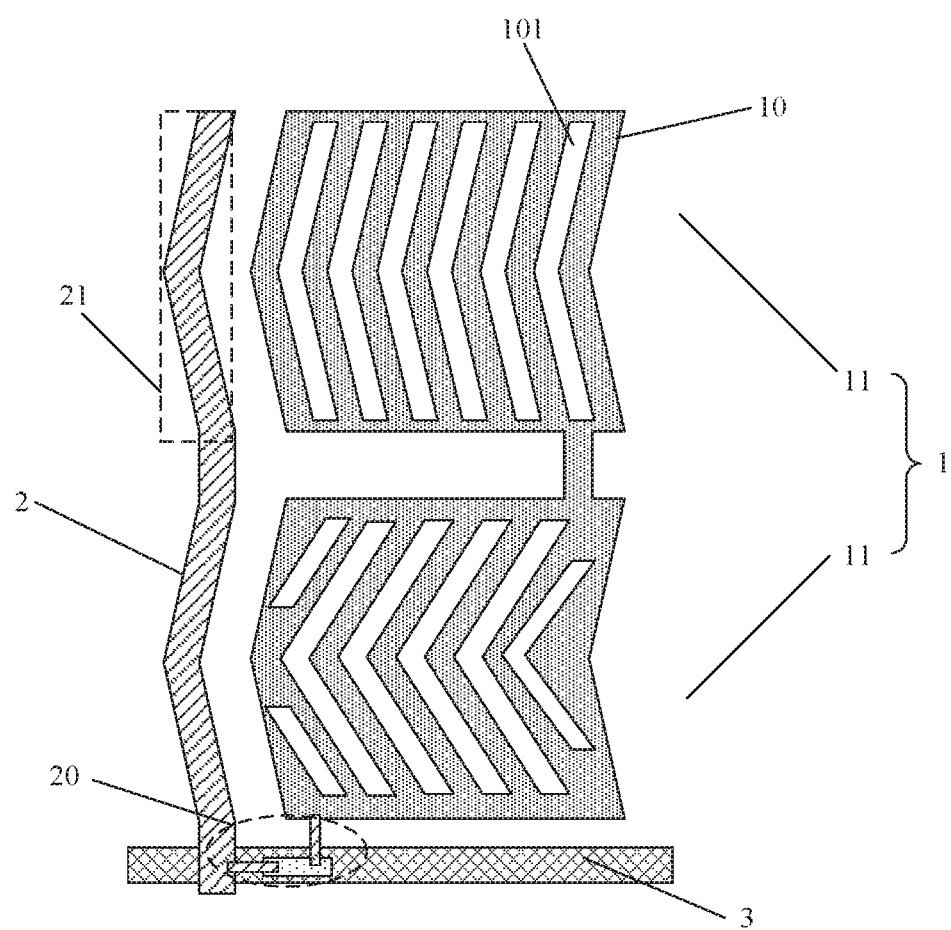
FIG. 2 is a schematic diagram of a pixel structure of an array substrate according to an embodiment of the present disclosure.

An embodiment of the present disclosure provides an array substrate, as shown in FIGS. 1 and 2, including a plurality of pixel units 1; each of the pixel units 1 includes a plurality of pixel regions 11, and each of the pixel regions 11 is provided with a display electrode 10 having a slit 101. The array substrate further includes a plurality of data lines 2, configured to supply data voltage signals to the display electrodes; each of the data lines 2 includes a plurality of data line segments 21, and any two adjacent data line segments 21 are electrically coupled to each other; wherein, in each of the pixel units 1, part of the pixel regions 11 have display electrodes 10 whose slits 101 are parallel to data line segments 21 in the data lines 2; part of the pixel regions 11 have display electrodes 10 whose slits 101 are non-parallel to data line segments 21 in the data lines 2.

In the array substrate of the present embodiment, for a same pixel unit 1, part of pixel regions 11 have display electrodes 10 whose slits 101 are disposed along a direction parallel to a direction along which data line segments 21 in the data lines 2 corresponding to this part of pixel regions are disposed, another part of pixel regions 11 have display electrodes 10 whose slits 101 are disposed along a direction non-parallel to a direction along which data line segments 21 in the data lines 2 corresponding to this another part of pixel regions are disposed, that is to say, for one pixel unit 1, there are slits 101 oriented variously, that is, the pixel unit 1 is a multiple-domain pixel structure. In this case, if the structure of display electrode 10 of this embodiment is applied to a FFS mode liquid crystal display device, then after applying a voltage to the display electrode 10, electric field formed at the edge of its slit 101 can increase the view angle of the pixel unit 1.

In the array substrate of the present embodiment, the data line segment 21 may be of polyline shape, or straight line shape. Obviously, the data line segment 21 may also be of arc line shape or the like. Particularly, if the data line segment 21 of the present embodiment is of polyline shape, when light emitted by a backlight passes through an edge of the data line 2, it is refracted at the edge of the data line 2, which allows the pixel unit 1 to have a wider view angle.

The structure of the array substrate of the present embodiment will be described below taking an example in which each pixel unit 1 has two display electrodes 10 arranged along a direction of the data line 2, the display electrodes 10 are pixel electrodes and the data line segment 21 is of polyline shape.

As shown in FIG. 1, as a first specific implementation of the present embodiment, the array substrate includes intercrossing gate lines 3 and data lines 2. The gate line 3 divides each pixel unit 1 into two pixel regions 11 arranged along the direction of the data line 2, each pixel region 11 is provided with one pixel electrode. In each pixel unit 1, two thin film transistors 20 are also provided at the position of the gate line 3, wherein, these two thin film transistors 20 share a common source S, and are coupled to the data line 2. A drain D1 of one thin film transistor 20 is coupled to one of the pixel electrodes by a via hole penetrating through an interlayer insulation layer, a drain D2 of the other thin film transistor 20 is coupled to the other of the pixel electrodes by a via hole penetrating through the interlayer insulation layer; these two thin film transistors 20 share a common gate G, which is an integrated structure with the gate line 3. The data line 2 includes data line segments 21 electrically coupled to each other; the data line segments 21 are of polyline shape, in which case, when light emitted by a backlight passes through an edge of the data line 2, it is refracted at the edge of the data line 2, which allows the pixel unit 1 to have a wider view angle. Meanwhile, the slit 101 of the display electrode 10 of the present embodiment also has a bent shape, and the slit 101 of one of the pixel electrodes is parallel to the data line segment 21, the slit 101 of the other of the pixel electrodes is non-parallel to the data line segment 21, in this case, one pixel unit 1 can have two domain orientations, which thus can further increase the view angle of the pixel unit 1.

As a second specific implementation of the present embodiment, as shown in FIG. 2, the array substrate includes intercrossing gate lines 3 and data lines 2, and pixel units 1 are defined at positions where they intercross; each pixel unit 1 includes two pixel regions 11 arranged along the direction of the data line 2, that is, these two pixel regions 11 are provided at the same side of the gate line of this pixel unit, each pixel region 11 is provided with one pixel electrode; and these two pixel electrodes are electrically coupled to each other. This pixel unit 1 is also provided with one thin film transistor 20, wherein, a source of the thin film transistor 20 is coupled to the data line 2, a drain thereof is coupled to one of the pixel electrodes, a gate thereof is an integrated structure with the gate line 3. The data line 2 includes data line segments 21 electrically coupled to each other; the data line segments 21 are of polyline shape, in which case, when light emitted by a backlight passes through an edge of the data line 2, it is refracted at the edge of the data line 2, which allows the pixel unit 1 to have a wider view angle. Meanwhile, the slit 101 of the display electrode 10 of the present embodiment is also of bent shape, and the slit 101 of one of the pixel electrodes is parallel to the data line segment 21, the slit 101 of the other of the pixel electrodes is non-parallel to the data line segment 21, in this case, one pixel unit 1 can have two domain orientations, which thus can further increase the view angle of the pixel unit 1.

Figure 3:
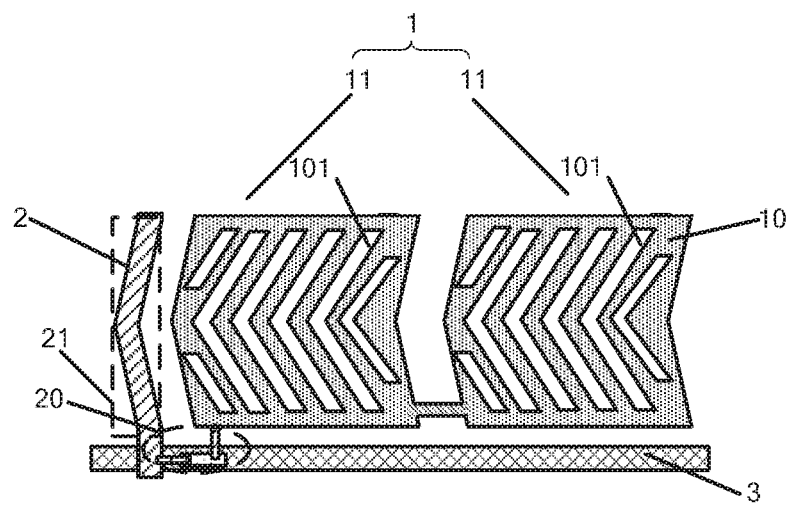
FIG. 3 is a schematic diagram of a pixel structure of an array substrate according to an embodiment of the present disclosure.

The implementation in which two pixel regions of each pixel unit are disposed along the extending direction of the data line (that is, vertical direction in FIG. 2) is described above referring to FIG. 2, but it is not limited thereto. Two pixel regions in each pixel unit may also be disposed along the extending direction of the gate line (that is, horizontal direction in FIG. 2), as shown in FIG. 3, description of which is similar to the above and is omitted herein.

Figure 4:
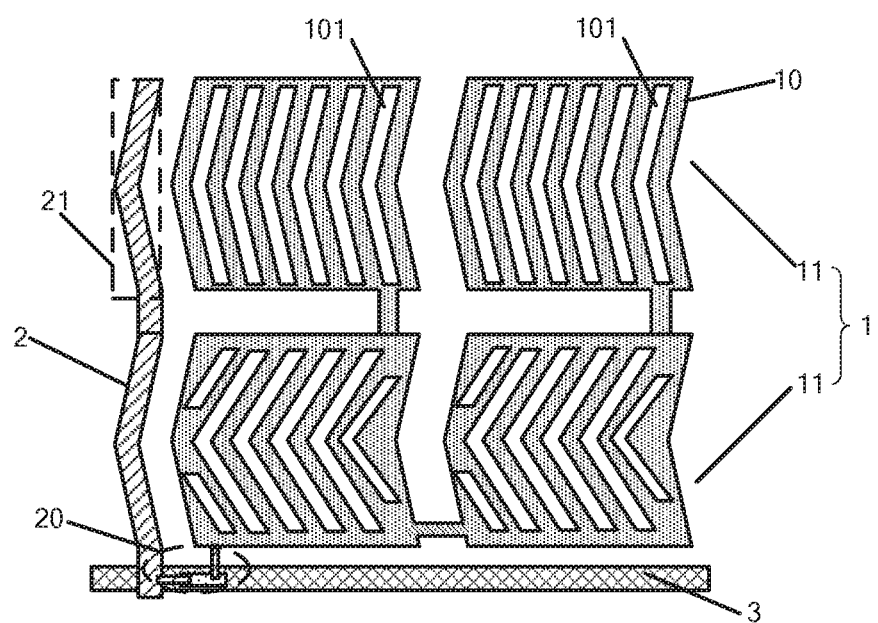
FIG. 4 is a schematic diagram of a pixel structure of an array substrate according to an embodiment of the present disclosure.

Furthermore, the above description is related to the example in which one pixel unit has two domain orientations, but the present invention is not limited thereto, one pixel unit may also have four domain orientations, as shown in FIG. 4, specific description of which is also omitted herein.

The arrangements of display electrodes having multiple domain orientations (having different slit orientations) as illustrated and described in the above embodiments are not limitative, arrangements of display electrodes in one pixel unit may be combined as necessary.

In a specific implementation, the above pixel electrode has a contour parallel to the data line segment 21. In this case, it is helpful for providing more pixel units 1 in the array substrate, to realize high-resolution design.

In a specific implementation, in the array substrate of the present embodiment, pixel units 1 located in the same column are coupled to a same one of the data lines 2; pixel units 1 located in the same row are coupled to a same one of the gate lines 3. Such a design is helpful for wiring of gate lines 3 and data lines 2 in the array substrate.

Obviously, the array substrate of the present embodiment also includes a common electrode located at a side of the pixel electrode facing away from light exiting surface. In this case, the common electrode may be a plate-shaped electrode, and of course, may also be a slit electrode. If the common electrode is a slit electrode, the position of its slit should be arranged alternately in space with the slit 101 of the pixel electrode. And if the common electrode is a slit electrode, then it may also be provided at a side of the pixel electrode close to the light exiting surface.

An embodiment of the present disclosure provides a display device, including the above array substrate, which is not described in detail herein.

It is obvious that, in the present embodiment, the display device may include: any product or component having a display function such as a liquid crystal panel, a mobile phone, a tablet PC, a television, a monitor, a notebook, a digital photo frame, a navigator and the like.

Because of the above array substrate, the display device of the present embodiment has a wider view angle.

Figure 5:
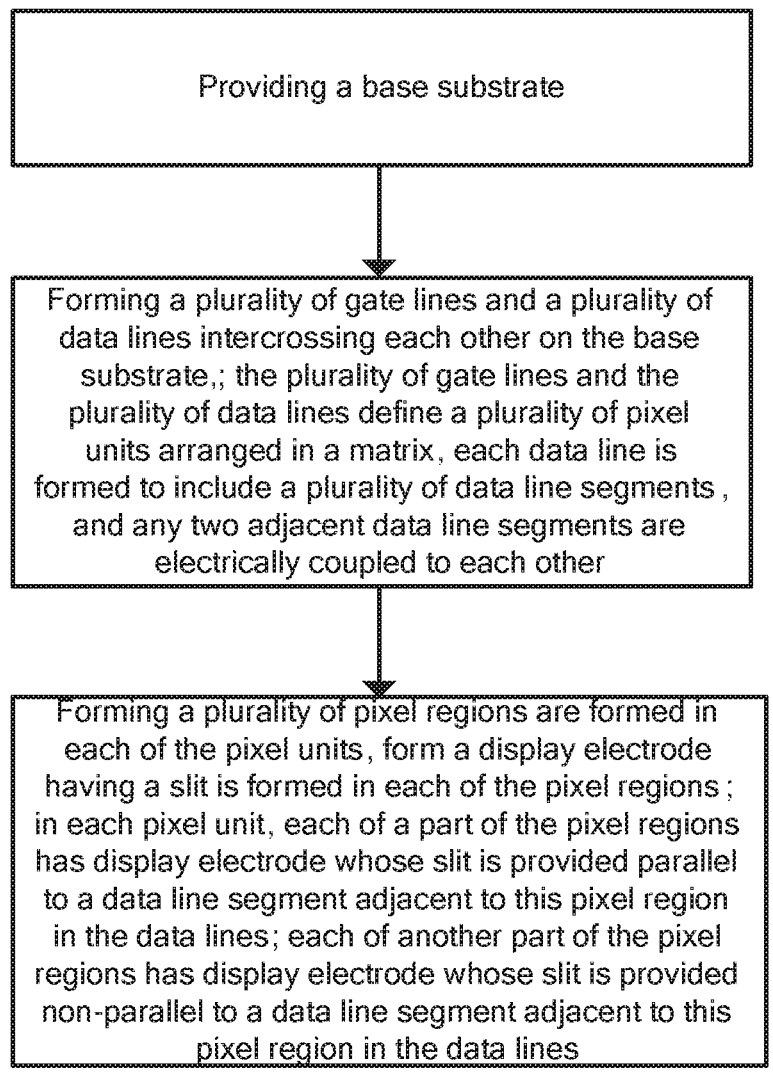
FIG. 5 is a flow chart of a method for manufacturing an array substrate according to an embodiment of the present disclosure.

An embodiment of the present disclosure further provides a method for manufacturing an array substrate, as shown in FIG. 5, the method including:

providing a base substrate;

forming a plurality of gale lines and a plurality of data lines intercrossing each other on the base substrate, the plurality of gate lines and the plurality of data lines define a plurality of pixel units arranged in a matrix, wherein, a plurality of pixel regions are formed in each of the pixel units, a display electrode having a slit is formed in each of the pixel regions;

each data line is formed to include a plurality of data line segments, and any two adjacent data line segments are electrically coupled to each other, and wherein, in each pixel unit, each of a part of the pixel regions has a display electrode whose slit is provided parallel to a data line segment adjacent to this pixel region in the data lines; each of another part of the pixel regions has a display electrode whose slit is provided non-parallel to a data line segment adjacent to this pixel region in the data lines.

Technical solutions of the present disclosure have the following beneficial effects: in the array substrate of the present disclosure, for a same pixel unit, part of pixel regions have display electrodes whose slits are parallel to directions of data line segments in data lines, another part of pixel regions have display electrodes whose slits are non-parallel to directions of data line segments in data lines, that is, for one pixel unit, there are slits oriented variously, that is, the pixel unit is a multiple-domain pixel structure. In this case, if the structure of display electrode of this embodiment is applied to a FFS mode display device, then after applying a voltage to the display electrode, the electric field formed at the edge of its slit can increase view angle of the pixel unit.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. An array substrate, comprising a plurality of pixel units arranged in a matrix, wherein each of the pixel units comprises a plurality of pixel regions, and each of the pixel regions comprises a display electrode having a slit; the array substrate further comprises a plurality of data lines, each of the data lines comprises a plurality of data line segments, and any two adjacent data line segments are electrically coupled to each other; wherein, in each of the pixel units, each of a part of the pixel regions has a display electrode whose slit is parallel to a data line segment adjacent to this display electrode in the data lines; each of another part of the pixel regions has a display electrode whose slit is non-parallel to a data line segment adjacent to this display electrode in the data lines, wherein the data line segment has a shape comprising a polyline type, and the slit of the display electrode is of a bent type, wherein each of the pixel units comprises one thin film transistor, a source of the thin film transistor is coupled to the data line, a drain of the thin film transistor is coupled to any one of the pixel electrodes of this pixel unit, a gate of the thin film transistor is coupled to the gate line, and the display electrodes are coupled to each other, and wherein the display electrodes in each of the pixel units are located at a same side of the gate line to which the pixel unit where the displace electrodes are located is coupled.

2. The array substrate according to claim 1, wherein the display electrode has a contour parallel to the data line segment.

3. The array substrate according to claim 1, wherein each of the pixel units comprises two pixel regions provided along a direction of the data line; the array substrate further comprises gate lines intercrossing with the data lines, wherein the gate line is located between the two pixel regions.

4. The array substrate according to claim 1, further comprising gate lines intercrossing with the data lines, and pixel units are defined at positions where the gate lines and the data lines intercross, wherein the display electrodes of each of the pixel units are at a same side of the gate line for this pixel unit.

5. The array substrate according to claim 4, wherein each of the pixel units comprises two pixel regions along a direction of the data line.

6. The array substrate according to claim 1, further comprising gate lines intercrossing with the data lines, wherein
pixel units located in a same column are coupled to a same one of the data lines; pixel units located in a same row are coupled to a same one of the gate lines.

7. The array substrate according to claim 1, wherein the display electrode comprises a pixel electrode.

8. The array substrate according to claim 7, further comprising a common electrode located at a side of the pixel electrode facing away from a light exiting surface.

9. A display device, comprising a counter substrate and the array substrate according to claim 1, which are arranged opposite to each other.

\* \* \* \* \*